(12) United States Patent
Li et al.

(10) Patent No.: US 10,694,401 B2
(45) Date of Patent: Jun. 23, 2020

(54) APPARATUS AND METHOD FOR FEEDING BACK DATA RECEIVING STATUS

(71) Applicant: Samsung Electronics Co., Ltd., Suwon-si, Gyeonggi-do (KR)

(72) Inventors: Yingyang Li, Beijing (CN); Chengjun Sun, Beijing (CN); Xiaoqiang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

(21) Appl. No.: 15/957,410

(22) Filed: Apr. 19, 2018

(65) Prior Publication Data
US 2018/0249354 A1 Aug. 30, 2018

Related U.S. Application Data

(63) Continuation of application No. 15/138,907, filed on Apr. 26, 2016, now Pat. No. 9,955,367, which is a (Continued)

(30) Foreign Application Priority Data

Apr. 30, 2010 (CN) .......................... 2010 1 0168684
Oct. 27, 2010 (CN) .......................... 2010 1 0527462
(Continued)

(51) Int. Cl.
*H04W 4/00* (2018.01)
*H04W 24/02* (2009.01)
(Continued)

(52) U.S. Cl.
CPC ............. *H04W 24/02* (2013.01); *H04J 11/00* (2013.01); *H04L 1/1607* (2013.01);
(Continued)

(58) Field of Classification Search
None
See application file for complete search history.

(56) References Cited

U.S. PATENT DOCUMENTS 8,194,601 B2 6/2012 Han et al.
8,767,797 B2 7/2014 Sambhwani
(Continued)

FOREIGN PATENT DOCUMENTS

CN 101378307 A 3/2009
CN 101465720 A 6/2009
(Continued)

OTHER PUBLICATIONS

Catt: "UL ACK/NACK Transmission Design in FDD with CA", 3GPP Draft; R1-100876, 3rd Generation Partnership Project (3GPP), Mobile Competence Centre; 650, Route Des Lucioles ; F-06921 Sophia-Anti Polis Cedex; France, vol. RAN WG1, No. San Francisco, USA; 20100222, Feb. 16, 2010, XP050418480.
(Continued)

*Primary Examiner* — Clemence S Han
(74) *Attorney, Agent, or Firm* — Jefferson IP Law, LLP

(57) ABSTRACT

An apparatus and a method for feeding back data receiving status, applied to a system, are provided. The method includes sequencing, by a User Equipment (UE), downlink subframes for transmitting data with respect to each Component Carrier (CC), generating receiving status feedback information for the first X downlink subframes with respect to each CC according to the result of the sequencing, where X≤M, wherein M is the number of downlink subframes on each CC, and transmitting the receiving status feedback information generated with respect to each CC to a base station. Accordingly, the UE will not misinterpret the receiving status for the downlink subframes due to inconsistencies with the base station between transmitting and receiving feedback. This affects the Hybrid Automatic Repeat Request
(Continued)

| ACK/NACK information | | | | ACK/NACK channel | QPSK constellation point |
|---|---|---|---|---|---|
| b0 | b1 | b2 | b3 | | |
| D | N/D | N/D | N/D | DTX | |
| N | N/D | N/D | N/D | h0 | 1 |
| A | N/D | N/D | N/D | h0 | −1 |
| N/D | A | N/D | N/D | h1 | −j |
| A | A | N/D | N/D | h1 | j |
| N/D | N/D | A | N/D | h2 | 1 |
| A | N/D | A | N/D | h2 | j |
| N/D | A | A | N/D | h2 | −j |
| A | A | A | N/D | h2 | −1 |
| N/D | N/D | N/D | A | h3 | 1 |
| A | N/D | N/D | A | h0 | −j |
| N/D | A | N/D | A | h3 | j |
| A | A | N/D | A | h0 | j |
| N/D | N/D | A | A | h3 | −j |
| A | N/D | A | A | h3 | −1 |
| N/D | A | A | A | h1 | 1 |
| A | A | A | A | h1 | −1 |

(HARQ) transmission, saves the uplink overheads occupied by the receiving status feedback information, and increases the uplink coverage area.

24 Claims, 14 Drawing Sheets

Related U.S. Application Data continuation of application No. 13/850,600, filed on Mar. 26, 2013, now Pat. No. 9,338,778, which is a continuation of application No. 13/095,359, filed on Apr. 27, 2011, now Pat. No. 8,416,739.

(30) Foreign Application Priority Data

Nov. 16, 2010 (CN) ............... 2010 1 0574732
Dec. 1, 2010 (CN) ............... 2010 1 0589610

(51) Int. Cl.
| | |
|---|---|
| H04L 1/18 | (2006.01) |
| H04L 1/16 | (2006.01) |
| H04W 72/04 | (2009.01) |
| H04J 11/00 | (2006.01) |
| H04L 5/00 | (2006.01) |
| H04L 5/14 | (2006.01) |

(52) U.S. Cl.
CPC .......... *H04L 1/1854* (2013.01); *H04L 1/1861* (2013.01); *H04L 5/0055* (2013.01); *H04L 5/14* (2013.01); *H04W 72/042* (2013.01); *H04W 72/0413* (2013.01); *H04W 72/0446* (2013.01); *H04L 1/1614* (2013.01); *H04L 1/1692* (2013.01); *H04L 1/1812* (2013.01)

(56) References Cited

U.S. PATENT DOCUMENTS

| | | | |
|---|---|---|---|
| 2007/0140102 A1 | 6/2007 | Oh et al. | |
| 2008/0095106 A1 | 4/2008 | Malladi et al. | |
| 2008/0130643 A1 | 6/2008 | Jain et al. | |
| 2009/0257387 A1 | 10/2009 | Gholmieh et al. | |
| 2009/0323613 A1* | 12/2009 | Frederiksen | H04L 1/1621 370/329 |
| 2010/0098012 A1 | 4/2010 | Bala et al. | |
| 2011/0002276 A1* | 1/2011 | Chen | H04W 72/0413 370/329 |
| 2011/0103323 A1 | 5/2011 | Wang et al. | |
| 2011/0128922 A1* | 6/2011 | Chen | H04L 5/0007 370/329 |
| 2011/0134774 A1 | 6/2011 | Pelletier et al. | |
| 2011/0243066 A1* | 10/2011 | Nayeb Nazar | H04L 1/007 370/328 |
| 2011/0255469 A1 | 10/2011 | Kishiyama et al. | |
| 2011/0268032 A1 | 11/2011 | Kim et al. | |
| 2011/0294491 A1 | 12/2011 | Fong et al. | |
| 2012/0044871 A1 | 2/2012 | Li et al. | |
| 2012/0057560 A1 | 3/2012 | Park et al. | |
| 2012/0093097 A1 | 4/2012 | Che et al. | |
| 2012/0106450 A1 | 5/2012 | Golitschek Edler Von Elbwart et al. | |
| 2012/0113913 A1 | 5/2012 | Tiirola et al. | |
| 2012/0327885 A1 | 12/2012 | Chung et al. | |
| 2013/0016687 A1 | 1/2013 | Yang et al. | |
| 2015/0319753 A1* | 11/2015 | Chen | H04L 5/001 370/277 |

FOREIGN PATENT DOCUMENTS

| | | |
|---|---|---|
| CN | 101499882 A | 8/2009 |
| CN | 101594211 A | 12/2009 |
| CN | 101616492 A | 12/2009 |
| CN | 101646237 A | 2/2010 |
| CN | 101662833 A | 3/2010 |
| EP | 2234303 A1 | 9/2010 |
| JP | 2010-504712 A | 2/2010 |
| JP | 2010-074754 A | 4/2010 |
| JP | 2010-512033 A | 4/2010 |
| JP | 2010-516066 A | 5/2010 |
| JP | 2010-124469 A | 6/2010 |
| RU | 2378768 C2 | 1/2010 |
| WO | 2009/082160 A1 | 7/2009 |
| WO | 2009/116760 A2 | 9/2009 |
| WO | 2010/002305 A1 | 1/2010 |
| WO | 2010/048142 A1 | 4/2010 |
| WO | 2011044170 A | 4/2011 |

OTHER PUBLICATIONS

ZTE: "A/N for TDD with PUCCH Format 1b with channel selection", 3GPP Draft; RI-110163, 3rd Generation Partnership Project (3GPP), Mobile Competence Centre ; 650, Route Des Lucioles ; F-06921 Sophia-Anti Polis Cedex; France, vol. RAN WGI, No. Dublin, Ireland; 20110117, Jan. 11, 2011, XP050490100.

Indian Office Action dated Jan. 4, 2019, issued in the Indian Application No. 2993/KOLNP/2012.

Alcatel-Lucent, Alcatel-Lucent Shanghai Bell, PUCCH A/N channel design in LTE-A, 3GPP TSG-RAN WG1#61 R1-102781, May 10, 2010.

Panasonic, Support of UL ACK/NACK channel selection for carrier aggregation[online], 3GPP TSG-RAN WG1#60b R1-102022, Apr. 12, 2010.

Catt, UL ACK/NACK Transmission Design in FDD with CA, 3GPP TSG-RAN WG1#60 R1-100876, Feb. 22, 2010.

Fujitsu, Channel Selection for A/N Feedback in CA, 3GPP TSG-RAN1 #62, Madrid, Spain, Aug. 23-27, 2010, pp. 1-6, R1-104875.

ETRI, ACK/NACK Transmission on PUCCH for Carrier Aggregation, 3GPP TSG RAN WG1 Meeting #59bis, Valencia, Spain, Jan. 18-22, 2010, pp. 1-5, R1-100462.

Ericsson et al., PUCCH Design for Carrier Aggregation, 3GPP TSG-RAN WG1 #60bis, Beijing, China, Apr. 12-16, 2010, R1-101730.

Catt et al., UL Control Channel Scheme for LTE-A, 3GPP TSG RAN WG1 Meeting #56, Athens, Greece, Feb. 9-13, 2009, R1-090939.

Catt, UL ACK/NACK Transmission Design in TDD with CA, 3GPP TSG RAN WG1 Meeting #60, San Francisco, USA, Feb. 22-26, 2010, R1-100875.

Ericsson, "Evaluation of PUCCH Proposals for Carrier Aggregation", R1-101731, 3GPP TSG RAN WG1 Meeting#60bis, Apr. 12, 2010.

Nokia Siemens Networks: Way Forward on Remaining Issues for TDD ACK/NAK Transmission on PUSCH, 3GPP TSG RAN WGI Meeting #54BIS, Prague, Czech Republic, Sep. 29-Oct. 3 2008, vol. RI-084059, Sep. 29, 2008 (Sep. 29, 2008), pp. 1-3, XP002636809.

Korean Notice of Patent Grant dated Jul. 25, 2018.

Brazilian Office Action dated Mar. Mar. 9, 2020, issued in a counterpart Brazilian Application No. BR112012027890-8.

\* cited by examiner

| PCC | SCC | ACK/NACK channel | | | |
|---|---|---|---|---|---|
| | | 1 | 2 | 3 | 4 |
| A,A | A,A | | −1 | | |
| A,N | A,A | | | −j | |
| N,A | A,A | | −j | | |
| N,N | A,A | | | | −1 |
| A,A | A,N | | j | | |
| A,N | A,N | | | 1 | |
| N,A | A,N | | 1 | | |
| N,N | A,N | | | | j |
| A,A | N,A | | | −1 | |
| A,N | N,A | | | j | |
| N,A | N,A | | | | −j |
| N,N | N,A | | | | 1 |
| A,A | N,N | −1 | | | |
| A,N | N,N | j | | | |
| N,A | N,N | −j | | | |
| N,N | N,N | 1 | | | |
| A,A | D,D | −1 | | | |
| A,N | D,D | j | | | |
| N,A | D,D | −j | | | |
| N,N | D,D | 1 | | | |
| D,D | A,A | | | | −1 |
| D,D | A,N | | | | j |
| D,D | N,A | | | | 1 |
| D,D | N,N | No transmission | | | |
| D,D | D,D | No transmission | | | |

FIG.3

| FEEDBACK STATUS FOR CC | | ACK/NACK INFORMATION AS FED BACK |
|---|---|---|
| FEEDBACK STATUS 1) | -> | BOTH ACK FOR RECEIVING STATUS FEEDBACK INFORMATION FOR FIRST TWO DOWNLINK SUBFRAMES |
| FEEDBACK STATUS 2) | -> | ACK FOR RECEIVING STATUS FEEDBACK INFORMATION FOR FIRST DOWNLINK SUBFRAME, NACK/DRX FOR RECEIVING STATUS FEEDBACK INFORMATION FOR SECOND DOWNLINK SUBFRAME |
| FEEDBACK STATUS 3) | -> | NACK AND ACK FOR RECEIVING STATUS FEEDBACK INFORMATION FOR FIRST TWO DOWNLINK SUBFRAMES RESPECTIVELY |
| FEEDBACK STATUS 4) | -> | EXCEPT FOR FEEDBACK INFORMATION 2), NACK/DRX FOR RECEIVING STATUS FEEDBACK INFORMATION FOR FIRST DOWNLINK SUBFRAME |

FIG.4

| FEEDBACK STATUS FOR CC | | ACK/NACK INFORMATION AS FED BACK |
|---|---|---|
| FEEDBACK STATUS 1) | -> | ALL ACK FOR RECEIVING STATUS FEEDBACK INFORMATION FOR FIRST THREE DOWNLINK SUBFRAMES |
| FEEDBACK STATUS 2) | -> | BOTH ACK FOR RECEIVING STATUS FEEDBACK INFORMATION FOR FIRST TWO DOWNLINK SUBFRAMES, NACK/DRX FOR RECEIVING STATUS FEEDBACK INFORMATION FOR THIRD DOWNLINK SUBFRAME |
| FEEDBACK STATUS 3) | -> | ACK FOR RECEIVING STATUS FEEDBACK INFORMATION FOR FIRST DOWNLINK SUBFRAME, NACK/ACK FOR RECEIVING STATUS FEEDBACK INFORMATION FOR SECOND DOWNLINK SUBFRAME |
| FEEDBACK STATUS 4) | -> | NACK/DRX FOR RECEIVING STATUS FEEDBACK INFORMATION FOR FIRST DOWNLINK SUBFRAME |

FIG.5

| FEEDBACK STATUS FOR CC | | ACK/NACK INFORMATION AS FED BACK |
|---|---|---|
| FEEDBACK STATUS 1) | -> | ALL ACK FOR RECEIVING STATUS FEEDBACK INFORMATION FOR FIRST THREE DOWNLINK SUBFRAMES, NACK/DRX FOR RECEIVING STATUS FEEDBACK INFORMATION FOR FOURTH DOWNLINK SUBFRAME |
| FEEDBACK STATUS 2) | -> | BOTH ACK FOR RECEIVING STATUS FEEDBACK INFORMATION FOR FIRST TWO DOWNLINK SUBFRAMES, NACK/DRX FOR RECEIVING STATUS FEEDBACK INFORMATION FOR THIRD DOWNLINK SUBFRAME |
| FEEDBACK STATUS 3) | -> | ACK FOR RECEIVING STATUS FEEDBACK INFORMATION FOR FIRST DOWNLINK SUBFRAME, NACK/ACK FOR RECEIVING STATUS FEEDBACK INFORMATION FOR SECOND DOWNLINK SUBFRAME; OR ALL ACK FOR RECEIVING STATUS FEEDBACK INFORMATION FOR FIRST FOUR DOWNLINK SUBFRAMES |
| FEEDBACK STATUS 4) | -> | NACK/DRX FOR RECEIVING STATUS FEEDBACK INFORMATION FOR FIRST DOWNLINK SUBFRAME |

FIG.6

| PCC OR SCC | | TWO-BIT ACK/NACK INFORMATION IN FDD MAPPING TABLE |
|---|---|---|
| FEEDBACK STATUS 1) | -> | (A, A) |
| FEEDBACK STATUS 2) | -> | (N, A) |
| FEEDBACK STATUS 3) | -> | (A, N) |
| FEEDBACK STATUS 4) | -> | (N, N) OR DTX |

FIG.7

| FEEDBACK STATUS FOR CC | | ACK/NACK INFORMATION AS FED BACK |
|---|---|---|
| FEEDBACK STATUS 1) | -> | ALL ACK FOR RECEIVING STATUS FEEDBACK INFORMATION FOR FIRST THREE DOWNLINK SUBFRAMES, NACK/DRX FOR RECEIVING STATUS FEEDBACK INFORMATION FOR FOURTH DOWNLINK SUBFRAME; OR ALL ACK FOR RECEIVING STATUS FEEDBACK INFORMATION FOR FIRST FOUR DOWNLINK SUBFRAMES |
| FEEDBACK STATUS 2) | -> | BOTH ACK FOR RECEIVING STATUS FEEDBACK INFORMATION FOR FIRST TWO DOWNLINK SUBFRAMES, NACK/DRX FOR RECEIVING STATUS FEEDBACK INFORMATION FOR THIRD DOWNLINK SUBFRAME |
| FEEDBACK STATUS 3) | -> | ACK FOR RECEIVING STATUS FEEDBACK INFORMATION FOR FIRST DOWNLINK SUBFRAME, NACK/ACK FOR RECEIVING STATUS FEEDBACK INFORMATION FOR SECOND DOWNLINK SUBFRAME |
| FEEDBACK STATUS 4) | -> | NACK/DRX FOR RECEIVING STATUS FEEDBACK INFORMATION FOR FIRST DOWNLINK SUBFRAME |

FIG.8

| FEEDBACK STATUS FOR CC | | ACK/NACK INFORMATION AS FED BACK |
|---|---|---|
| FEEDBACK STATUS 1) | -> | ALL ACK FOR RECEIVING STATUS FEEDBACK INFORMATION FOR FIRST FOUR DOWNLINK SUBFRAMES |
| FEEDBACK STATUS 2) | -> | ALL ACK FOR RECEIVING STATUS FEEDBACK INFORMATION FOR FIRST THREE DOWNLINK SUBFRAMES, NACK/DRX FOR RECEIVING STATUS FEEDBACK INFORMATION FOR FOURTH DOWNLINK SUBFRAME |
| FEEDBACK STATUS 3) | -> | BOTH ACK FOR RECEIVING STATUS FEEDBACK INFORMATION FOR FIRST TWO DOWNLINK SUBFRAMES, ACK/ACK FOR RECEIVING STATUS FEEDBACK INFORMATION FOR THIRD DOWNLINK SUBFRAME |
| FEEDBACK STATUS 4) | -> | ACK FOR RECEIVING STATUS FEEDBACK INFORMATION FOR FIRST DOWNLINK SUBFRAME, NACK/DRX FOR RECEIVING STATUS FEEDBACK INFORMATION FOR SECOND DOWNLINK SUBFRAME; OR NACK/DRX FOR RECEIVING STATUS FEEDBACK INFORMATION FOR FIRST DOWNLINK SUBFRAME |

FIG.9

| FEEDBACK STATUS FOR CC | | ACK/NACK INFORMATION AS FED BACK |
|---|---|---|
| FEEDBACK STATUS 1) | -> | ALL ACK FOR RECEIVING STATUS FEEDBACK INFORMATION FOR FIRST FOUR DOWNLINK SUBFRAMES; OR ALL ACK FOR RECEIVING STATUS FEEDBACK INFORMATION FOR FIRST THREE DOWNLINK SUBFRAMES, DRX FOR RECEIVING STATUS FEEDBACK INFORMATION FOR FOURTH DOWNLINK SUBFRAME |
| FEEDBACK STATUS 2) | -> | ALL ACK FOR RECEIVING STATUS FEEDBACK INFORMATION FOR FIRST THREE DOWNLINK SUBFRAMES, NACK FOR RECEIVING STATUS FEEDBACK INFORMATION FOR FOURTH DOWNLINK SUBFRAME; OR BOTH ACK FOR RECEIVING STATUS FEEDBACK INFORMATION FOR FIRST TWO DOWNLINK SUBFRAMES, NACK/ACK FOR RECEIVING STATUS FEEDBACK INFORMATION FOR THIRD DOWNLINK SUBFRAME |
| FEEDBACK STATUS 3) | -> | ACK FOR RECEIVING STATUS FEEDBACK INFORMATION FOR FIRST DOWNLINK SUBFRAME, NACK/DRX FOR RECEIVING STATUS FEEDBACK INFORMATION FOR SECOND DOWNLINK SUBFRAME |
| FEEDBACK STATUS 4) | -> | NACK/DRX FOR RECEIVING STATUS FEEDBACK INFORMATION FOR FIRST DOWNLINK SUBFRAME |

FIG.10

| FEEDBACK STATUS FOR CC | | ACK/NACK INFORMATION AS FED BACK |
|---|---|---|
| FEEDBACK STATUS 1) | -> | ALL ACK FOR RECEIVING STATUS FEEDBACK INFORMATION FOR FIRST THREE DOWNLINK SUBFRAMES, NACK/DRX FOR RECEIVING STATUS FEEDBACK INFORMATION FOR FOURTH DOWNLINK SUBFRAME |
| FEEDBACK STATUS 2) | -> | BOTH ACK FOR RECEIVING STATUS FEEDBACK INFORMATION FOR FIRST TWO DOWNLINK SUBFRAMES, NACK/ACK FOR RECEIVING STATUS FEEDBACK INFORMATION FOR THIRD DOWNLINK SUBFRAME |
| FEEDBACK STATUS 3) | -> | ALL ACK FOR RECEIVING STATUS FEEDBACK INFORMATION FOR FIRST FOUR DOWNLINK SUBFRAMES; OR ACK FOR RECEIVING STATUS FEEDBACK INFORMATION FOR FIRST DOWNLINK SUBFRAME, ALL DRX FOR RECEIVING STATUS FEEDBACK INFORMATION FOR LAST THREE DOWNLINK SUBFRAMES |
| FEEDBACK STATUS 4) | -> | ACK FOR RECEIVING STATUS FEEDBACK INFORMATION FOR FIRST DOWNLINK SUBFRAME, NOT ALL DRX FOR RECEIVING STATUS FEEDBACK INFORMATION FOR LAST THREE DOWNLINK SUBFRAMES; OR NACK/DRX FOR RECEIVING STATUS FEEDBACK INFORMATION FOR FIRST DOWNLINK SUBFRAME |

FIG.11

| ACK/NACK information | | | | ACK/NACK channel | QPSK constellation point |
|---|---|---|---|---|---|
| b0 | b1 | b2 | b3 | | |
| D | N/D | N/D | N/D | DTX | |
| N | N/D | N/D | N/D | h0 | 1 |
| A | N/D | N/D | N/D | h0 | −1 |
| N/D | A | N/D | N/D | h1 | −j |
| A | A | N/D | N/D | h1 | j |
| N/D | N/D | A | N/D | h2 | 1 |
| A | N/D | A | N/D | h2 | j |
| N/D | A | A | N/D | h2 | −j |
| A | A | A | N/D | h2 | −1 |
| N/D | N/D | N/D | A | h3 | 1 |
| A | N/D | N/D | A | h0 | −j |
| N/D | A | N/D | A | h3 | j |
| A | A | N/D | A | h0 | j |
| N/D | N/D | A | A | h3 | −j |
| A | N/D | A | A | h3 | −1 |
| N/D | A | A | A | h1 | 1 |
| A | A | A | A | h1 | −1 |

FIG.12

| PCC OR SCC | | TWO-BIT ACK/NACK INFORMATION IN FDD MAPPING TABLE |
|---|---|---|
| FEEDBACK STATUS 1) | -> | (A, A) |
| FEEDBACK STATUS 2) | -> | (N/D, A) |
| FEEDBACK STATUS 3) | -> | (A, N/D) |
| FEEDBACK STATUS 4) | -> | (N/D, N/D) |

FIG.13

APPARATUS AND METHOD FOR FEEDING BACK DATA RECEIVING STATUS

PRIORITY

This application is a continuation application of prior application Ser. No. 15/138,907, filed on Apr. 26, 2016, which will issue as U.S. Pat. No. 9,955,367 on Apr. 24, 2018, which is a continuation application of prior application Ser. No. 13/850,600, filed on Mar. 26, 2013, which issued as U.S. Pat. No. 9,338,778 on May 10, 2016, which is a continuation application of prior application Ser. No. 13/095,359, filed on Apr. 27, 2011, which issued as U.S. Pat. No. 8,416,739 on Apr. 9, 2013 and was based and claimed priority under 35 U.S.C. § 119(a) of a Chinese patent application filed on Apr. 30, 2010 in the Chinese Intellectual Property Office and assigned Serial No. 201010168684.8, a Chinese patent application filed on Oct. 27, 2010 in the Chinese Intellectual Property Office and assigned Serial No. 201010527462.0, a Chinese patent application filed on Nov. 16, 2010 in the Chinese Intellectual Property Office and assigned Serial No. 201010574732.3, and a Chinese patent application filed on Dec. 1, 2010 in the Chinese Intellectual Property Office and assigned Serial No. 201010589610.1, the disclosure of which is incorporated by reference herein in its entirety.

BACKGROUND OF THE INVENTION

1. Field of the Invention

The present invention relates to the field of radio communication technologies. More particularly, the present invention relates to an apparatus and a method for feeding back data receiving status.

2. Description of the Related Art

A Long Term Evolution (LTE) system transmits data based on Hybrid Automatic Repeat Request (HARQ), i.e., a data receiver will send receiving status feedback information of Acknowledgement (ACK) or Non-Acknowledgement (NACK) according to the corresponding data receiving status. Scheduling information for dynamic downlink data transmission is transmitted through a Physical Downlink Control Channel (PDCCH), whereas except for Semi-Persistent Scheduling (SPS), initial transmission scheduling information for downlink data does not need to be transmitted through the PDCCH, and only at the time of retransmission of the downlink data, the scheduling information needs to be transmitted through the PDCCH.

For an LTE Time Division Duplexing (TDD) system, when the number of downlink subframes is larger than that of uplink subframes, receiving status feedback information for the data of multiple downlink subframes needs to be transmitted collectively in the same uplink subframe. One of the methods for the feeding back is to perform an "AND" operation on the receiving status feedback information for the downlink subframes that transmit data, so as to obtain receiving status feedback information of one bit for each code word. Because the downlink data transmission is scheduled dynamically through a PDCCH, and User Equipment (UE) may not be able to receive a PDCCH transmitted from a base station, there may be inconsistencies between the receiver and transmitter in the method of performing an "AND" operation according to code word. To address this problem, a Downlink Assignment Index (DAI) is used in the LTE TDD system to indicate the serial number of the current downlink subframe in the radio frame that transmits the PDCCH, so that the UE can detect whether a PDCCH in the downlink subframes has been lost. For a radio frame with 4 downlink subframes, the value of the DAI may be 1, 2, 3 and 4.

There is, however, a problem with the above method, i.e., a case in which the last several PDCCHs are lost cannot be detected. In the LTE TDD, therefore, it is specified that the UE needs to feed back receiving status feedback information on a receiving status feeding-back channel corresponding to the last one downlink subframe that receives a PDCCH, so that the base station can get aware of whether the UE has lost the PDCCHs of the last several downlink subframes from the channel on which the UE feeds back the receiving status feedback information.

In a Long Term Evolution-Advanced (LTE-A) system, a Carrier Aggregation (CA) technology has been used to support a higher transmission rate, in which two or more Component Carriers (CC) are aggregated to obtain a larger working bandwidth. For example, to support a bandwidth of 100 MHz, 5 CCs of 20 MHz may be aggregated. Based on CA, the base station transmits downlink data to the UE on two or more CCs. Correspondingly, the UE also needs to support the receiving status feedback information for the downlink data received from the two or more CCs.

According to the current results of discussions on LTE-A, at most 4 bits of ACK/NACK transmission can be supported based on the technology of channel selection. In LTE-A Frequency Division Duplexing (FDD), the method of channel selection actually supports only two CCs and at most 2 bits of ACK/NACK information can be fed back on each CC. Taking a 4-bit table as an example, for a Primary CC (PCC) and a Secondary CC (SCC) employing cross-CC scheduling, the two ACK/NCK channels are obtained by scheduling PDCCHs for downlink data transmission. For example, assuming the minimum CCE index of PDCCH is n, the two ACK/NACK channels may be obtained through mapping by using an LTE method from CCE indexes n and n+1. For a SCC not employing cross-CC scheduling, the two ACK/NACK channels are configured by the higher layer, and the flexibility in assignment may be increased through an ACK/NACK Resource Indicator (ARI). According to the current results of discussions, a 4-bit mapping table as shown in FIG. 3 is employed in an FDD system. Here, ACK/NACK channels 1 and 2 correspond to the two ACK/NACK bits of a PCC sequentially and ACK/NACK channels 3 and 4 correspond to the two ACK/NACK bits of a SCC sequentially. In the table of FIG. 3, the feature that the two ACK/NACK channels always are present at the same time on or absent at the same time from the same CC is utilized to optimize the performance. Another 4-bit mapping table is as shown in FIG. 12. Here, only when some ACK/NACK information is ACK, the ACK/NACK channel corresponding thereto is selected for transmission. The only exception is that to take full advantage of the feedback capabilities of M (M is equal to 2, 3 or 4) ACK/NACK channels, when the first piece of ACK/NACK information is NACK and the remaining pieces of ACK/NACK information are all NACK or Discontinuous Reception (DRX), a Quadrature Phase-Shift Keying (QPSK) constellation point of the first ACK/NACK channel may be used for the indication. The method as illustrated in FIG. 12 may be applied to the scenario in which the 4 ACK/NACK bits and the corresponding ACK/NACK channels are all independent of one another.

In the tables, N denotes NACK, A denotes ACK, D denotes DRX and the symbol "/" denotes "or".

For an LTE-A TDD system, in a case of supporting CA, the UE needs to feed back significantly more bits of receiving status feedback information than in single carrier transmission. For example, when a radio frame has 4 downlink subframes for transmitting data and 5 CCs, assuming Multiple Input Multiple Output (MIMO) data transmission is configured for the UE, 40 bits of receiving status feedback information need to be fed back. Apparently, if the method of feeding back receiving status feedback information for single carrier is also used, many uplink overheads will be occupied and the uplink coverage area will be reduced. Moreover, all the uplink control channels currently supported in an LTE system cannot support so large an amount of receiving status feedback information. If it needs to support 40 bits of feedback, the structure of feeding-back channels needs to be redefined, which significantly increases the complexity of standardization.

Therefore, a need exists for an apparatus and a method for feeding back data receiving status, so as to reduce the uplink overheads occupied by the receiving status feedback information and increase the uplink coverage area.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for feeding back data receiving status, so as to reduce the uplink overheads occupied by the receiving status feedback information and increase the uplink coverage area.

In accordance with an aspect of the present invention, a method for feeding back data receiving status, applied to a system is provided. The method includes sequencing, by an User Equipment (UE), downlink subframes for transmitting data with respect to each Component Carrier (CC), generating receiving status feedback information for the first X downlink subframes with respect to each CC according to the result of the sequencing, where X≤M, wherein M is the number of downlink subframes on each CC, and transmitting the receiving status feedback information generated with respect to each CC to a base station.

As can be seen from the above technical description, the UE sequences downlink subframes for transmitting data with respect to each CC, generates receiving status feedback information for the first X downlink subframes according to the result of the sequencing, and transmits the receiving status feedback information for each CC to the base station. Because the UE reports the receiving status for only X downlink subframes, the base station may perform a Hybrid Automatic Repeat Request (HARQ) processing on the first X downlink subframes. For the last downlink subframes, the base station may perform a processing by assuming that the UE does not receive the Physical Downlink Control Channels (PDCCHs). Therefore, the base station can reach an agreement with the UE on the receiving status of the UE, ensuring that the UE will not misinterpret the receiving status for the downlink subframes due to inconsistencies with the base station between transmitting and receiving feedback so that the HARQ transmission is affected. Moreover, an exemplary embodiment of the present invention employs a method of feeding back the receiving status feedback information for only the first X downlink subframes, which, in the Carrier Aggregation (CA) technology, saves the uplink overheads occupied by the receiving status feedback information and increases the uplink coverage area.

Other aspects, advantages, and salient features of the invention will become apparent to those skilled in the art from the following detailed description, which, taken in conjunction with the annexed drawings, discloses exemplary embodiments of the invention

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 3 illustrates a 4-bit mapping table employed in a Long Term Evolution-Advanced (LTE-A) Frequency Division Duplexing (FDD) system according to an exemplary embodiment of the present invention;

FIG. 4 illustrates bundled feedback status when M=2 according to an exemplary embodiment of the present invention;

FIG. 5 illustrates bundled feedback status when M=3 according to an exemplary embodiment of the present invention;

FIG. 6 illustrates bundled feedback status when M=4 according to an exemplary embodiment of the present invention;

FIG. 7 illustrates a mapping relationship from feedback status to 2-bit Acknowledgement/Non-Acknowledgement (ACK/NACK) in an FDD table according to an exemplary embodiment of the present invention;

FIG. 8 illustrates processing 5 types of feedback information into 4 types of status to be fed back according to an exemplary embodiment of the present invention;

FIG. 9 illustrates processing 5 types of feedback information into 4 types of status to be fed back according to an exemplary embodiment of the present invention;

FIG. 10 illustrates processing 5 types of feedback information into 4 types of status to be fed back according to an exemplary embodiment of the present invention;

FIG. 11 illustrates processing 5 types of feedback information into 4 types of status to be fed back according to an exemplary embodiment of the present invention;

FIG. 12 illustrates a 4-bit mapping table according to an exemplary embodiment of the present invention;

FIG. 13 illustrates a mapping relationship from feedback status to 2-bit ACK/NACK according to an exemplary embodiment of the present invention.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide an apparatus and a method for feeding back data receiving status, so as to reduce the uplink overheads occupied by the receiving status feedback information and increase the uplink coverage area.

FIGS. 1 through 14, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Figure 1:
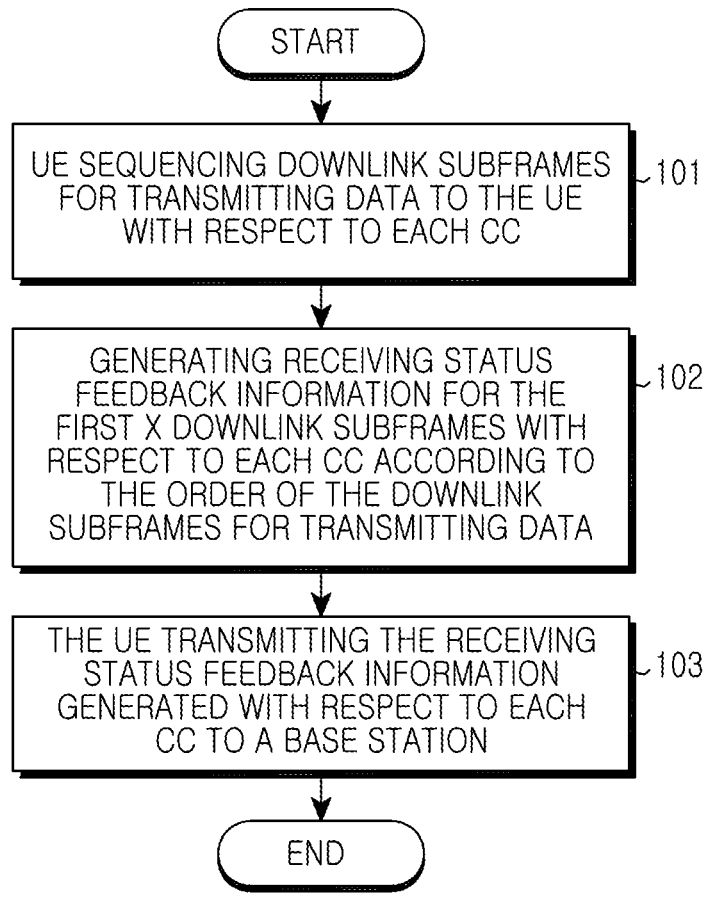
FIG. 1 is a flowchart illustrating a method for feeding back data receiving status according to an exemplary embodiment of the present invention.

FIG. 1 is a flowchart illustrating a method for feeding back data receiving status according to an exemplary embodiment of the present invention.

Referring to FIG. 1, a User Equipment (UE) sequences downlink subframes for transmitting data for the UE with respect to each Component Carrier (CC) in step 101. More particularly, sequencing priorities may be set from higher to lower for downlink subframes transmitting Semi Persistent Scheduling (SPS) service data and downlink subframes transmitting dynamic data.

If there are multiple downlink subframes transmitting SPS service data, they may be sequenced by subframe indexes occupied by the downlink subframes transmitting SPS service data. If there are multiple downlink subframes transmitting dynamic data, they may be sequenced in an ascending order of Downlink Assignment Indexes (DAIs).

If there is no downlink subframe transmitting SPS service data, downlink subframes transmitting dynamic data may be sequenced directly in an ascending order of DAIs.

In Carrier Aggregation (CA), there may be some CCs transmitting data not for the UE, or the UE may have not received data from some CCs. For such CCs, receiving status feedback information of Discontinuous Reception (DRX) is generated directly. That is to say, the CCs from which the UE has not received data will not be involved in steps 102 and 103, according to an exemplary embodiment of the present invention.

In step 102, receiving status feedback information for the first X downlink subframes may be generated with respect to each CC according to the order of the downlink subframes for transmitting data, where X≤M, M being the number of downlink subframes on a CC. In this step, receiving status feedback information is generated with respect to each CC according to the sequencing in step 101.

According to an exemplary embodiment of the present invention, only the receiving status feedback information for the first X downlink subframes is fed back with respect to each CC. The receiving status feedback information as fed back may include all Acknowledgement (ACK) for the first X downlink subframes or all Non-Acknowledgement (NACK) for the first X downlink subframes. Alternatively, both ACK and NACK may be included, i.e., ACK for some of the first X downlink subframes and NACK for others, DRX for some of the first X downlink subframes, or others. No feedback will be made for the last M-X downlink subframes. More particularly, X may not have a fixed value, and may take different values depending on different receiving status feedback information for the downlink subframes sequenced according to step 101.

Upon receiving the receiving status feedback information on the CC, the base station performs a Hybrid Automatic Repeat Request (HARQ) processing on the downlink data of the first X downlink subframes according to the corresponding receiving status feedback information. For the downlink data of the last M-X downlink subframes, the base station has to perform a processing by assuming that the UE does not receive the Physical Downlink Control Channels (PDCCHs) that schedule such data.

The UE may first perform spatial bundling on the receiving status feedback information for two Code Words (CWs) in each downlink subframe. That is to say, in a case of Multiple Input Multiple Output (MIMO) transmission, an "AND" operation is performed on the receiving status feedback information for the two CWs to obtain a piece of bundled receiving status feedback information. When no MIMO transmission is applied, one piece of receiving status feedback information is obtained directly. Afterwards, the receiving status feedback information for only the first X downlink subframes is fed back and no feedback is made for the last M-X downlink subframes.

If more accurate receiving status needs to be fed back, the spatial bundling may not be performed. That is, in the case of MIMO data transmission, receiving status feedback information for two CWs is fed back with respect to each subframe of the first X downlink subframes. In this case, two exemplary implementations of generating receiving status feedback information may be used.

In a first exemplary implementation, receiving status feedback information for the first X1 downlink subframes is fed back with respect to a CW with an index of 0 and receiving status feedback information for the first X2 downlink subframes is fed back with respect to a CW with an index of 1, where X1≤M and X2≤M. X1 and X2 may or may not be equal to each other. That is to say, receiving status feedback information for the first several downlink subframes is fed back with respect to each CW.

With respect to the CW with an index of 0, the generated receiving status feedback information may be all ACK for the first X1 downlink subframes or all NACK for the first X1 downlink subframes. Alternatively, both ACK and NACK may be included, i.e., ACK for some of the first X1 downlink subframes and NACK for others, DRX for some of the first X1 downlink subframes, or others. Similarly, with respect to the CW with an index of 1, the generated receiving status feedback information may be all ACK for the first X2 downlink subframes or all NACK for the first X2 downlink subframes. Alternatively, both ACK and NACK may be included, i.e., ACK for some of the first X2 downlink subframes and NACK for others, DRX for some of the first X2 downlink subframes, or others.

Upon receiving the receiving status feedback information on the CC that is fed back respectively with respect to the two CWs, the base station performs a HARQ processing on the CW with an index of 0 in the first X1 downlink subframes according to the corresponding receiving status feedback information. For the CW with an index of 0 in other downlink subframes, the base station performs a processing by assuming that the UE does not receive the PDCCHs that schedule such downlink subframes. The base station performs a HARQ processing on the CW with an index of 1 in the first X2 downlink subframes according to the corresponding receiving status feedback information. For the CW with an index of 1 in other downlink subframes, the base station performs a processing by assuming that the UE does not receive the PDCCHs that schedule such downlink subframes.

Taking an example for the first method, assume MIMO data transmission is applied to a CC and no spatial bundling is performed, but receiving status feedback information for each CW is fed back. If M is equal to 3, 5 types of receiving status feedback information may be generated for each CW. For example, 1) all ACK for receiving status feedback information for the first 3 downlink subframes, 2) all ACK for receiving status feedback information for the first 2 downlink subframes, 3) all ACK for receiving status feedback information for the first downlink subframe, 4) NACK and ACK for receiving status feedback information for the first 2 downlink subframes, and 5) NACK or DRX for receiving status feedback information for the first downlink subframe. Therefore, 5×5=25 types of information in total need to be fed back with respect to the two CWs of each CC.

In a second exemplary implementation, receiving status feedback information for two CWs is fed back respectively with respect to each subframe of the first X downlink subframes.

In this case, the generated receiving status feedback information may be all ACK for the two CWs of the first X downlink subframes or all NACK for the two CWs of the first X downlink subframes. Alternatively, both ACK and NACK may be included, i.e., ACK for the two CWs of some of the first X downlink subframes and NACK for the two CWs of others, DRX for the two CWs of some of the first X downlink subframes, or others.

Upon receiving the receiving status feedback information on the CC for the first X downlink subframes, the base station performs a HARQ processing on the two CWs in the first X downlink subframes according to the corresponding receiving status feedback information. For other downlink subframes, the base station performs a processing by assuming that the UE does not receive the PDCCHs that schedule such downlink subframes.

Taking an example for the second exemplary implementation, MIMO data transmission may be applied to a CC and no spatial bundling is performed, but receiving status for the two CWs in the first X downlink subframes is fed back respectively. If M is equal to 4, there may be 13 types of receiving status feedback information. More particularly, 1) all ACK and ACK for feedback information for the two CWs in the first X (i.e., X is equal to 1, 2, 3 or 4) downlink subframes, 2) all ACK and NACK for feedback information for the two CWs in the first X downlink subframes, 3) all NACK and ACK for feedback information for the two CWs in the first X downlink subframe, 4) NACK and DRX for feedback information for the two CWs in the first downlink subframe, and so on.

In addition, for a CC configured with a MIMO data transmission mode, only one CW may be transmitted in a subframe, i.e., the other CW is not used to transmit data in the subframe. In this case, one of the handling methods is to define a fixed value for feedback information for this CW that does not transmit data, such as ACK, NACK and DRX. Another handling method is to sequence the downlink subframes with respect to each CW in step 101 and to sequence the downlink subframes only with respect to the CW that actually transmits data. These two handling methods are both compatible with the aforementioned method and have no influence thereon.

In step 103, the UE transmits the receiving status feedback information generated with respect to each CC to the base station.

In this step, the UE may employ a method of coding the receiving status feedback information for the CCs jointly for transmission. Other methods may also be employed, e.g., a method based on channel selection, and the like.

The UE may feed back receiving status feedback information with respect to all the CCs in a cell, may feed back receiving status feedback information with respect to the CCs configured for the UE by the base station, or may feed back receiving status feedback information with respect to the active CCs configured for the UE by the base station.

With regard to step 102, examples of receiving status feedback information fed back with respect to the CCs are described below wherein M takes different values. In this case, it is assumed that 5 types of information need to be fed back with respect to a CC.

Assume M is equal to 2. If spatial bundling is applied to receiving status feedback information for each downlink subframe, then based on the sequencing of downlink subframes for transmitting data in an order based on service type and DAI, the receiving status feedback information may include 1) both ACK for receiving status feedback information for the first 2 downlink subframes, 2) ACK for receiving status feedback information for the first downlink subframe, 3) NACK and ACK respectively for receiving status feedback information for the first 2 downlink subframes, 4) NACK for receiving status feedback information for the first downlink subframe and not ACK for receiving status feedback information for the second downlink subframe, if present, and 5) DRX for receiving status feedback information for the first downlink subframe.

Assume M is equal to 3. If spatial bundling is applied to receiving status feedback information for each downlink subframe, then based on the sequencing of downlink subframes for transmitting data in an order based on service type and DAI, the receiving status feedback information may include 1) all ACK for receiving status feedback information for the first 3 downlink subframes, 2) both ACK for receiving status feedback information for the first 2 downlink subframes, 3) ACK for receiving status feedback information for the first downlink subframe, 4) NACK and ACK respectively for receiving status feedback information for the first 2 downlink subframes, 5) NACK for receiving status feedback information for the first downlink subframe and not ACK for receiving status feedback information for the second downlink subframe, if present, or DRX for receiving status feedback information for the first downlink subframe.

Assume M is equal to 4. If spatial bundling is applied to receiving status feedback information for each downlink subframe, then based on the sequencing of downlink subframes for transmitting data in an order based on service type and DAI, the receiving status feedback information may include 1) all ACK for receiving status feedback information for the first 4 downlink subframes, 2) all ACK for receiving status feedback information for the first 3 downlink subframes, 3) both ACK for receiving status feedback information for the first 2 downlink subframes, 4) ACK for receiving status feedback information for the first downlink subframe, and 5) NACK or DRX for receiving status feedback information for the first downlink subframe.

An exemplary embodiment of the present invention is not limited to the above examples of receiving status feedback information and the number of types of receiving status feedback information generated with respect to each CC is not limited to 5.

In above step 102, assume 4 types of feedback status need to be fed back for a CC and thus two bits can be used for the indication thereof. The methods of generating feedback status will be described below with respect to different values of M.

FIG. 4 illustrates bundled feedback status when M=2 according to an exemplary embodiment of the present invention.

Referring to FIG. 4, assume M is equal to 2. If spatial bundling is applied to receiving status feedback information for each downlink subframe, then based on the sequencing of downlink subframes for transmitting data in an order based on service type and DAI, as shown in FIG. 4, the 4 types of feedback status are defined as 1) both ACK for receiving status feedback information for the first 2 downlink subframes, 2) ACK for receiving status feedback information for the first downlink subframe and NACK/DRX for receiving status feedback information for the second downlink subframe, 3) NACK and ACK respectively for receiving status feedback information for the first 2 downlink subframes, and 4) except for feedback status 2), NACK/DRX for receiving status feedback information for the first downlink subframe.

FIG. 5 illustrates bundled feedback status when M=3 according to an exemplary embodiment of the present invention.

Referring to FIG. 5, assume M is equal to 3. If spatial bundling is applied to receiving status feedback information for each downlink subframe, then based on the sequencing of downlink subframes for transmitting data in an order based on service type and DAI, as shown in FIG. 5, the 4 types of feedback status are defined as 1) all ACK for receiving status feedback information for the first 3 downlink subframes, 2) both ACK for receiving status feedback information for the first 2 downlink subframes and NACK/DRX for receiving status feedback information for the third downlink subframe, 3) ACK for receiving status feedback information for the first downlink subframe and NACK/DRX for receiving status feedback information for the second downlink subframe, and 4) NACK/DRX for receiving status feedback information for the first downlink subframe.

FIG. 6 illustrates bundled feedback status when M=4 according to an exemplary embodiment of the present invention.

Referring to FIG. 6, assume M is equal to 4. If spatial bundling is applied to receiving status feedback information for each downlink subframe, then based on the sequencing of downlink subframes for transmitting data in an order based on service type and DAI, 5 types of feedback information may be obtained first a) all ACK for receiving status feedback information for the first 4 downlink subframes, b) all ACK for receiving status feedback information for the first 3 downlink subframes and NACK/DRX for receiving status feedback information for the fourth downlink subframe, c) both ACK for receiving status feedback information for the first 2 downlink subframes and NACK/DRX for receiving status feedback information for the third downlink subframe, d) ACK for receiving status feedback information for the first downlink subframe and NACK/DRX for receiving status feedback information for the second downlink subframe, and e) NACK/DRX for receiving status feedback information for the first downlink subframe. Then the 4 types of status to be fed back are obtained through multi-to-one mapping of the 5 types of feedback information. As shown in FIG. 6, for example, the base station may map feedback information types a) and d) to the same status type, i.e., feedback status type 3), and map feedback information types b), c) and e), respectively, to the other 3 types of status, i.e., feedback status types 1), 2) and 4), so that they can be indicated with 2 bits. With such a multi-to-one method, when both feedback information types a) and d) are possible, the base station cannot determine the feedback information is actually a) or d). A possible solution is to perform a processing taking the number of successive ACKs as 4 when the base station has actually transmitted data of 4 subframes and to perform a processing taking the number of successive ACKs as 1 when the base station has actually transmitted data of less than 4 subframes. Exemplary embodiments of the present invention will not limit the particular behavior of the base station.

FIG. 8 illustrates processing 5 types of feedback information into 4 types of status to be fed back according to an exemplary embodiment of the present invention.

Referring to FIG. 8, where 4 types of feedback status are obtained through multi-to-one mapping of the 5 types of feedback information, i.e., in which two types of feedback information are combined into the same status type, the base station may in practice process the combined status type in view of the feedback information type with a less number of successive ACKs, so as to avoid inconsistencies. As shown in FIG. 8, for example, feedback information types a) and b) are combined into feedback status type 1) and the other three types of feedback information c), d) and e) are mapped respectively to feedback status types 2), 3) and 4). The base station handles, in a fixed way, the HARQ transmission of feedback status type 1) according to feedback information type b), i.e., ACK for receiving status feedback information for only the first 3 downlink subframes. In this way, even when the UE receives the data of 4 subframes completely correctly, the base station will retransmit the data of the fourth subframe.

FIG. 9 illustrates processing 5 types of feedback information into 4 types of status to be fed back according to an exemplary embodiment of the present invention.

Referring to FIG. 9, feedback information types d) and e) are combined into feedback status type 4) and the other three types of feedback information a), b) and c) are mapped respectively to feedback status types 1), 2) and 3). The base station handles, in a fixed way, the HARQ transmission of feedback status type 4) according to feedback information type e), i.e., retransmits all the data. With this method, there are no inconsistencies with the base station between feedback information types, but unnecessary retransmissions may be increased.

In an exemplary embodiment of the present invention, feedback status type 1) refers to the first type of feedback status, feedback status type 2) refers to the second type of feedback status, feedback status type 3) refers to the third type of feedback status, and feedback status type 4) refers to the fourth type of feedback status.

In an exemplary implementation of processing the 5 types of feedback information into the 4 types of feedback status, one of the feedback information types is divided into two types of sub-status, which are combined with two other types of feedback information, so as to obtain 4 types of feedback status.

FIG. 10 illustrates processing 5 types of feedback information into 4 types of status to be fed back according to an exemplary embodiment of the present invention.

Referring to FIG. 10, feedback information type b) may be divided into sub-information type b1), i.e., all ACK for receiving status feedback information for the first 3 downlink subframes and DRX for receiving status feedback information for the fourth downlink subframe, and sub-information type b2), i.e., all ACK for receiving status feedback information for the first 3 downlink subframes and NACK for receiving status feedback information for the fourth downlink subframe. Then sub-information type b1) and feedback information type a) are combined into the same feedback status type 1), sub-information type b2) and feedback information type c) are combined into the same feedback status type 2), and feedback information types d) and e) are mapped respectively to feedback status types 3) and 4). A method performed by the base station is described as follows. When the base station has actually scheduled the data of 4 subframes, feedback status type 1) may indicate that all the 4 subframes have been received correctly or the first 3 subframes have been received correctly and the PDCCH of the fourth subframe has been lost. As designed for the Long Term Evolution (LTE) system, the probability of losing a PDCCH is very low, which is about 0.01 and the UE supporting the CA is in a better channel state so that the probability of receiving PDCCHs correctly is very high. In an implementation, the base station may also increase purposely the probability of receiving the PDCCH of the fourth subframe, so as to reduce the probability of sub-information type b1). Therefore, the base station may treat feedback status type 1) as feedback information type a). When the base station has actually scheduled the data of 4 subframes, feedback information type a) is impossible. Therefore, the base station may treat feedback status type 1) as sub-information type b1). In the case of feedback status type 2), because there may be no great difference between the probabilities of feedback information type c) and sub-information type b2), the base station may handle the HARQ transmission according to feedback information type c) in a fixed way. Here, in the case of sub-information type b2) in actual, the base station may retransmit the data of the third subframe additionally. An advantage of this mapping method lies in that when the base station schedules data of only less than or equal to 3 subframes, there is actually no repeated mapping of feedback information, thereby ensuring an optimized performance.

FIG. 11 illustrates processing 5 types of feedback information into 4 types of status to be fed back according to an exemplary embodiment of the present invention.

Referring to FIG. 11, feedback information type d) may be divided into sub-information type d1), i.e., ACK for receiving status feedback information for the first downlink subframe and DRX for receiving status feedback information for the last 3 downlink subframes, and sub-information type d2), i.e., ACK for receiving status feedback information for the first downlink subframes and not all DRX for receiving status feedback information for the last 3 downlink subframes. Thereafter, sub-information type d1) and feedback information type a) are combined into the same feedback status type 1), sub-information type d2) and feedback information type e) are combined into the same feedback status type 4), and feedback information types b) and c) are mapped respectively to feedback status types 2) and 3). A method performed by the base station is described as follows. When the base station has actually scheduled the data of 4 subframes, feedback status type 1) may indicate that all the 4 subframes have been received correctly or the UE has received the first subframe correctly and that the PDCCHs of the last 3 subframes have been lost. As designed for the LTE system, the probability of losing a PDCCH is very low, which is about 0.01 and the probability of losing the PDCCH of 3 subframes is even lower. Therefore, when the base station receives feedback status type 1), the possibility in which the information fed back from the UE actually is a) is very high. Therefore, the base station may treat feedback status type 1) as feedback information type a). When the base station has actually scheduled the data of 4 subframes, feedback information type a) is impossible. Therefore, the base station may treat feedback status type 1) as sub-information type d1). In the case of feedback status type 4), because there may be no great difference between the probabilities of feedback information type e) and sub-information type d2), the base station may handle the HARQ transmission according to feedback information type e) in a fixed way. In this case, because a user of CA usually needs to transmit many data and with this method, feedbacks on the scenarios in which the data of 4, 3 and 2 subframes, calculated from the first subframe, are received correctly are optimized, it is easy to increase the downlink throughput when the base station actually transmits the data of 4 subframes. However, when the base station schedules data of only less than or equal to 3 subframes, the feedback information is not optimal with this method.

Exemplary embodiments of the present invention may take full advantage of DAI. The DAI may be used not only for sequencing the downlink subframes for transmitting data, but also for increasing the information amount of receiving status feedback information.

Figure 2:
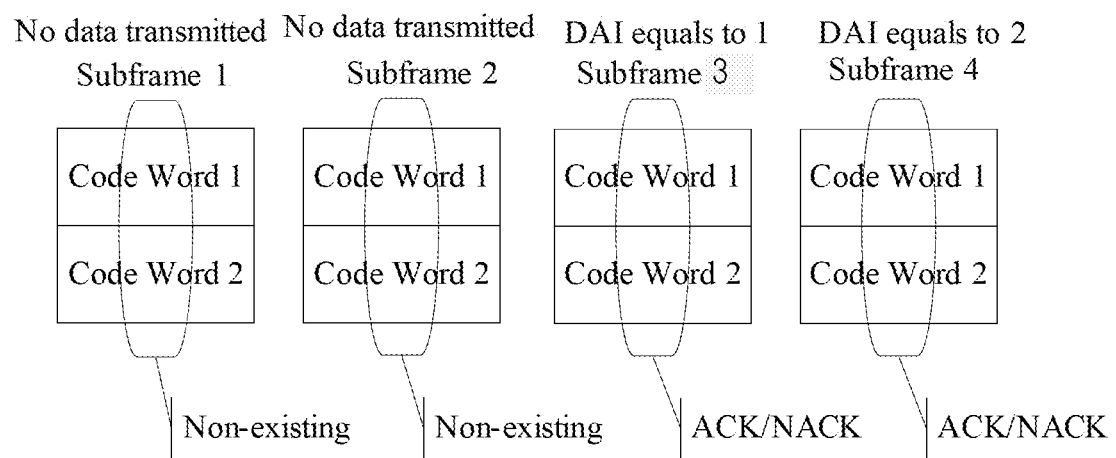
FIG. 2 illustrates a downlink subframe transmission status according to an exemplary embodiment of the present invention.

FIG. 2 illustrates a downlink subframe transmission status according to an exemplary embodiment of the present invention.

Referring to FIG. 2, an example is illustrated in which, when M is equal to 4, the downlink subframe with a DAI of 1 is the third downlink subframe of the M downlink subframes. In this case, possible feedback information can only be ACK for receiving status feedback information for the first two downlink subframes, ACK for receiving status feedback information for the first downlink subframe, or NACK/DRX for receiving status feedback information for the first downlink subframe. It is not possible that receiving status feedback information for the first 4 downlink subframes is ACK and receiving status feedback information for the first 3 downlink subframes is ACK. Accordingly, the method in which there are 5 types of receiving status feedback information cannot take full advantage of the capability of uplink feedback.

According to an exemplary embodiment of the present invention, the form of receiving status feedback information may be determined according to the position of the downlink subframe with a DAI of 1 in the M downlink subframes, thereby increasing the information amount of receiving status feedback information for each CC without increasing the overheads and further improving the performance of downlink transmission.

More particularly, referring back to step 102 of FIG. 1, the UE can obtain a maximum number N of downlink subframes to which the base station may transmit downlink data, according to the position of the downlink subframe with a DAI of 1 in the M downlink subframes. In this case, the UE may generate receiving status feedback information in such a way that receiving status feedback information for the data of N downlink subframes is transmitted in an uplink subframe. Correspondingly, the base station receives feedback information also in such a way that receiving status feedback information for the data of N downlink subframes is transmitted in an uplink subframe.

The value of N is discussed below. If no SPS service data is included in the M downlink subframes, the subframe index of the downlink subframe with a DAI of 1 is assumed to be k, where k takes a value of 1 to M. When the UE receives the PDCCH of the downlink subframe with a DAI of 1, the UE may determine that the maximum value of the number of the downlink subframes to which the base station transmits data is M−k+1. The UE may transmit feedback information in such a way that receiving status feedback information for the data of the M−k+1 downlink subframes is transmitted in an uplink subframe. Correspondingly, the base station receives feedback information also in such a way that receiving status feedback information for the data of the M−k+1 downlink subframes is transmitted in an uplink subframe.

If SPS service data is included in the M downlink subframes, the subframe index of the downlink subframe with a DAI of 1 is assumed to be k, where k takes a value of 1 to M, and the number of downlink subframes for transmitting the SPS service data and each with an index less than k is assumed to be $M_{SPS}$. When the UE receives the PDCCH of the downlink subframe with a DAI of 1, the UE may determine that the maximum value of the number of the downlink subframes to which the base station transmits data is $M-k+1+M_{SPS}$. The UE may transmit feedback information in such a way that receiving status feedback information for the data of the $M-k+1+M_{SPS}$ downlink subframes is transmitted in an uplink subframe. Correspondingly, the base station receives feedback information also in such a way that receiving status feedback information for the data of the $M-k+1+M_{SPS}$ downlink subframes is transmitted in an uplink subframe.

Referring back to FIG. 2, M is assumed to be equal to 4. Because the base station has actually scheduled and transmitted data, the base station is aware that the downlink subframe with a DAI of 1 is the third one and thus receives receiving status feedback information from the UE in such a way that receiving status feedback information for the data of 2 downlink subframes is transmitted in an uplink subframe. On the other hand, when the UE receives the downlink subframe with a DAI of 1, the UE may determine that the maximum value of the number of the downlink subframes to which the base station transmits data is 2 and thus feed back receiving status feedback information in such a way that receiving status feedback information for the data of 2 downlink subframes is transmitted in an uplink subframe. However, when the UE does not receive the PDCCH and data of the downlink subframe with a DAI of 1, although the UE is not aware of the position of the downlink subframe with a DAI of 1, the UE discards the PDCCH and data of the downlink subframe with a DAI of 1 and may feed back fixed NACK or DRX, avoiding any inconsistencies.

An exemplary implementation in which receiving status feedback information is generated according to the position of the downlink subframe with a DAI of 1 is described below. Again, assume M is equal to 4 and 5 types of feedback information are generated with respect to each CC.

When the downlink subframe with a DAI of 1 is the first one in the M downlink subframes, feedback information is transmitted in such a way that receiving status feedback information for the data of 4 downlink subframes is transmitted in an uplink subframe. Based on the sequencing of subframes for transmitting data in an order based on service type and DAI, the receiving status feedback information as fed back is 1) all ACK for receiving status feedback information for the first 4 downlink subframes, 2) all ACK for receiving status feedback information for the first 3 downlink subframes, 3) both ACK for receiving status feedback information for the first 2 downlink subframes, 4) ACK for receiving status feedback information for the first downlink subframe, and 5) NACK or DRX for receiving status feedback information for the first downlink subframe.

When the downlink subframe with a DAI of 1 is the second one in the M downlink subframes, feedback information is transmitted in such a way that receiving status feedback information for the data of 3 downlink subframes is transmitted in an uplink subframe. Based on the sequencing of subframes for transmitting data in an order based on service type and DAI, the receiving status feedback information is 1) all ACK for receiving status feedback information for the first 3 downlink subframes, 2) both ACK for receiving status feedback information for the first 2 downlink subframes, 3) ACK for receiving status feedback information for the first downlink subframe, 4) NACK and ACK respectively for receiving status feedback information for the first 2 downlink subframes, 5) NACK for receiving status feedback information for the first downlink subframe and not ACK for receiving status feedback information for the second downlink subframe, if present, or DRX for receiving status feedback information for the first downlink subframe.

When the downlink subframe with a DAI of 1 is the third one in the M downlink subframes, feedback information is transmitted in such a way that receiving status feedback information for the data of 2 downlink subframes is transmitted in an uplink subframe. Based on the sequencing of subframes for transmitting data in an order based on service type and DAI, the receiving status feedback information is 1) both ACK for receiving status feedback information for the first 2 downlink subframes, 2) ACK for receiving status feedback information for the first downlink subframe, 3) NACK and ACK respectively for receiving status feedback information for the first 2 downlink subframes, 4) NACK for receiving status feedback information for the first downlink subframe and not ACK for receiving status feedback information for the second downlink subframe, if present, and 5) DRX for receiving status feedback information for the first downlink subframe.

When the downlink subframe with a DAI of 1 is the fourth one in the M downlink subframes, feedback information is transmitted in such a way that receiving status feedback information for the data of only 1 downlink subframe is transmitted in an uplink subframe. In the case of MIMO data transmission, complete receiving status feedback information of the two Transport Blocks (TBs) may be fed back, i.e., two bits of ACK/NACK information and DRX status, 5 types of status in total. When no MIMO data transmission is applied, three types of feedback status, i.e., ACK, NACK and DRX may be defined for a TB with two additional types of null status, i.e., 5 types of status in total. Alternatively, 5 types of feedback status may be mapped out in such a way that the receiving status feedback information of the other TB is a certain fixed value (ACK or NACK).

Another exemplary implementation in which feedback status is generated according to the position of the downlink subframe with a DAI of 1 is described below. Again, assume M is equal to 4 and 4 types of feedback status are generated with respect to each CC.

When the downlink subframe with a DAI of 1 is the first one in the M downlink subframes, feedback information is transmitted in such a way that receiving status feedback information for the data of 4 downlink subframes is transmitted in an uplink subframe. Based on the sequencing of subframes for transmitting data in an order based on service type and DAI, the feedback status is fed back according to for example one of the methods as shown in FIGS. 6 through 11.

When the downlink subframe with a DAI of 1 is the second one in the M downlink subframes, feedback information is transmitted in such a way that receiving status feedback information for the data of 3 downlink subframes is transmitted in an uplink subframe. Based on the sequencing of subframes for transmitting data in an order based on service type and DAI, the feedback status is fed back according to, for example, the method as shown in FIG. 5.

When the downlink subframe with a DAI of 1 is the third one in the M downlink subframes, feedback information is transmitted in such a way that receiving status feedback information for the data of 2 downlink subframes is transmitted in an uplink subframe. Based on the sequencing of subframes for transmitting data in an order based on service type and DAI, the feedback status is fed back according to, for example, the method as shown in FIG. 4.

When the downlink subframe with a DAI of 1 is the fourth one in the M downlink subframes, feedback information is transmitted in such a way that receiving status feedback information for the data of only 1 downlink subframes is transmitted in an uplink subframe. In the case of MIMO data transmission, complete receiving status feedback information of the two TBs may be fed back, i.e., two bits of ACK/NACK information. When no MIMO data transmission is applied, three types of feedback status, i.e., ACK, NACK and DRX may be defined for a TB with an additional type of null status, i.e., 4 types of status in total. Alternatively, 4 types of feedback status may be mapped out in such a way that the receiving status feedback information of the other TB is a certain fixed value (ACK or NACK).

Referring back to step 103 of FIG. 1, the receiving status feedback information for the individual CCs may be joint-coded for transmission. For example, if the number of types of feedback status for each CC is taken as Y, the number of CCs is taken as N, and ceil($\log_2$ (Y)) bits may be used to represent the Y types of feedback status for each CC, where ceil( ) represents rounding up, then the total number of bits to be fed back is N·ceil($\log_2$ (Y)). Thereafter, the N·ceil($\log_2$ (Y)) bits are channel-coded and transmitted. Alternatively, the total number of types of actual feedback status for the N CCs is $Y^N$, and they can be represented by ceil (N·$\log_2$ (Y)) bits. The ceil(N·$\log_2$(Y)) bits are then channel-coded and transmitted. Here, the method for channel-coding may be convolution coding, RM coding, and the like. In fact, when Y is a power of 2, the above two methods are equivalent to each other. Finally, the channel-coded bits may be transmitted, after being subject to subsequent process, on ACK/NACK channels (for example, Physical Uplink Control Channel (PUCCH) format 2 or 3 channel, or others).

Still referring to step 103 of FIG. 1, the feedback status for the individual CCs may be transmitted based on the channel selection method. Assume Y types of feedback status are fed back with respect to each CC. Here, in the definition of a mapping table based on channel selection, if a feedback status type denotes that feedback information for data of the first X downlink subframes that the UE receives is a combination of ACK and NACK, it can be ascertained that all the ACK/NACK channels corresponding to the data for the first X downlink subframes exist. If data of each downlink subframe correspond to at least one ACK/NACK channel, which is configured semi-statically for an SPS service, or is obtained through a PDCCH for a dynamically scheduled service, then ACK/NACK information may be fed back on the X ACK/NACK channels based on channel selection. In this way, a mapping table based on channel selection for a CA system is defined. More particularly, for each combination of feedback information for the individual CCs, an ACK/NACK channel and a Quadrature Phase-Shift Keying (QPSK) constellation point are selected for use from available ACK/NACK channels corresponding to the combination of feedback information.

To reduce the complexity in the standardization, the 4-bit mapping table for Long Term Evolution-Advanced (LTE-A) Frequency Division Duplexing (FDD) may be multiplexed in LTE-A Time Division Duplexing (TDD). Assume the total number of CCs is 2. In an FDD system, 2 bits of ACK/NACK information can be fed back with respect to each CC. In a TDD system, accordingly, two bits of ACK/NACK information also need to be fed back with respect to each CC, i.e., the total number Y of feedback status types is equal to 4. In an FDD system, two ACK/NACK channels correspond to the two ACK/NACK bits for each CC. In a TDD system, accordingly, two ACK/NACK channels also need to be obtained for each CC.

More particularly, for the Primary CC (PCC), in absence of SPS service, the two ACK/NACK channels are obtained from the PDCCH for the downlink data with a DAI of 1. For example, assuming the minimum CCE index of PDCCH is n, the two ACK/NACK channels may be obtained through mapping by using an LTE method from CCE indexes n and n+1. Alternatively, the first ACK/NACK channel may be determined from the PDCCH for the downlink data with a DAI of 1 and the second ACK/NACK channel may be determined from the PDCCH for the downlink data with a DAI of 2. In another alternative, the first ACK/NACK channel may be determined from the PDCCH for the downlink data with a DAI of 1 and for the second ACK/NACK channel, multiple candidate channels may be configured by the higher layer and the ACK/NACK Resource Indicator (ARI) for PDCCHs of the Secondary CC (SCC) may be scheduled to indicate an actually-used channel, thereby increasing the flexibility in resource assignment. In the case of SPS service, the ACK/NACK channels semi-statically configured for the SPS service may be used for the channel selection. Here, two ACK/NACK channels may be semi-statically assigned for the SPS service by the higher layer, so that as with in absence of SPS service, two ACK/NACK channels are available and no special processing is required. Alternatively, the higher layer configures, by using an LTE method, only one semi-static ACK/NACK channel, which serves as the first ACK/NACK channel, and for the second ACK/NACK channel, multiple candidate channels may be configured by the higher layer and the ARI for PDCCHs of the SCC may be scheduled to indicate an actually-used channel, thereby increasing the flexibility in resource assignment. In another alternative, the higher layer configures, by using an LTE method, only one semi-static ACK/NACK channel, which serves as the first ACK/NACK channel, and the ACK/NACK determined from the PDCCH for the downlink data with a DAI of 1 serves as the second ACK/NACK channel.

For the cross-CC scheduled SCC, in absence of SPS service, the two ACK/NACK channels are obtained from the PDCCH for the downlink data with a DAI of 1. For example, assuming the minimum CCE index of PDCCH is n, the two ACK/NACK channels may be obtained through mapping by using an LTE method from CCE indexes n and n+1. Alternatively, the first ACK/NACK channel may be determined from the PDCCH for the downlink data with a DAI of 1 and the second ACK/NACK channel may be determined from the PDCCH for the downlink data with a DAI of 2. In another alternative, the first ACK/NACK channel may be determined from the PDCCH for the downlink data with a DAI of 1 and for the second ACK/NACK channel, multiple candidate channels may be configured by the higher layer and the ARI for PDCCHs of the SCC may be scheduled to indicate an actually-used channel, thereby increasing the flexibility in resource assignment. For the SCC to which no cross-CC scheduling is applied, the two ACK/NACK channels are configured by the higher layer and indicated by the ARIs. More particularly, multiple candidate channels are configured by the higher layer and the ARIs for PDCCHs of the SCC are scheduled to indicate two actually-used channels, thereby increasing the flexibility in resource assignment.

After the ACK/NACK channels are assigned according to the above methods, the two ACK/NACK channels for the PCC are denoted as channel 1 and channel 2, and the two ACK/NACK channels for the SCC are denoted as channel 3 and channel 4. Next, a correspondence between the 4 types of feedback status for each CC and the two-bit ACK/NACK information types for each CC is further defined in a mapping table for FDD. For example, a mapping relationship as shown in FIG. 7 may be employed. In this way, the 4-bit mapping table for FDD may be multiplexed in a TDD system with the above channel selection method and mapping relationship.

FIG. 3 illustrates a 4-bit mapping table employed in an LTE-A FDD system according to an exemplary embodiment of the present invention.

Referring to FIG. 3, feedback status types may be defined for different values of M with one of the methods as illustrated in FIGS. 4, 5 and 6, and the mapping relationship between feedback status types and two-bit ACK/NACK information types for each CC in a mapping table for FDD may be employed as shown in FIG. 7.

FIG. 7 illustrates a mapping relationship from feedback status to 2-bit ACK/NACK in an FDD table according to an exemplary embodiment of the present invention.

Referring to FIG. 7, a feedback status type 4) needs to be mapped to 2 bits (N, N), because they both indicate feedback information NACK or DRX, feedback status type 3) is mapped to 2 bits (A, N), which is determined from the 4-bit mapping table as shown in FIG. 3. In a TDD system, when the UE receives only one piece of SPS data from the PCC, the UE actually has only one available ACK/NACK channel semi-statically configured for the SPS service. To indicate the ACK/NACK feedback information in this case, the selected ACK/NACK channel is either this ACK/NACK channel semi-statically configured for the SPS service or an ACK/NACK channel of the SCC. Referring back to FIG. 3, the above requirements are met only when the feedback information for the PCC is (A, N), i.e., the selected ACK/NACK channel is either the first ACK/NACK channel of the PCC or a corresponding ACK/NACK channel of the SCC. Next, the ACK/NACK channels are assigned according to one of the methods described above. Still referring to FIG. 3, when the 2 bits for the SCC represent any of the combinations (A, N), (N, A) and (A, A), two candidate channels of the SCC need to be configured to support the channel selection. Whereas the UE may receive only data of one downlink subframe with a DAI of 1 from the SCC, or the base station may actually transmit only data of one downlink subframe with a DAI of 1 through the SCC. Therefore, it is not practical to determine an ACK/NACK channel for the data of the downlink subframe with a DAI of 1 and determine another ACK/NACK channel for the data of the downlink subframe with a DAI of 2. In contrast, the ACK/NACK channels may not suffice for the channel selection. In conclusion, after the mapping of feedback status is determined and the ACK/NACK channels to be used are assigned, the first and the second ACK/NACK channels for the PCC are denoted as channel 1 and channel 2, respectively, and the first and the second ACK/NACK channels for the SCC are denoted as channel 3 and channel 4, respectively, thereby fully multiplexing the 4-bit mapping table for FDD as shown in FIG. 3.

In a 4-bit table for FDD, when feedback status types for Pcell and Scell are both (N, N) or DRX, it can be identified that the feedback status type for Pcell is which of (N, N) and DRX. Accordingly, in a TDD system, when feedback status types for Pcell and Scell are both feedback status type 4), there may be two different instances of feedback status type 4) for Pcell. In the first instance, no SPS service is applied and the UE can determine from the DAI that the PDCCH with a DAI of 1 has been lost, where the UE may not have an available ACK/NACK channel at all. The second instance refers to feedback information in an instance other than the first instance of feedback status type 4). In the second instance, more particularly, an SPS service is configured where the UE has at least one available ACK/NACK channel, or in absence of SPS data, the UE has received dynamic data scheduled with respect to at least the PDCCH with a DAI of 1, where the UE also has at least one available ACK/NACK channel. In this way, corresponding to (N, N, N, N) and (N, N, D, D) in the table as shown in FIG. 3, the channel and constellation point indicate the second instance of feedback status type 4) for Pcell and feedback status type 4) for Scell. In regard to (D, D, N, N) and (D, D, D, D) in the table as shown in FIG. 3, the UE may not transmit any uplink signal, which indicates the first instance of feedback status type 4) for Pcell and feedback status type 4) for S cell.

The above exemplary implementation has been described with reference to FIG. 3. Hereinafter, exemplary implementations will be described with reference to a 4-bit mapping table supporting the independent existence of 4 ACK/NACK channels, for example, the mapping table as shown in FIG. 12.

FIG. 12 illustrates a 4-bit mapping table according to an exemplary embodiment of the present invention.

Referring to FIG. 12, the methods as illustrated in FIGS. 4, 5 and 6 may also be employed to define feedback status types for different values of M, and to define a mapping relationship between feedback status types and two-bit ACK/NACK information types, the table as shown in FIG. 7 may need to be extended, i.e., interpreting the feedback information N in FIG. 3 as NACK or DRX, so as to obtain a mapping table as shown in FIG. 13. Here, there may be two different instances of feedback status type 4) in FIG. 13. In the first instance, no SPS service is applied and the UE can determine from the DAI that the PDCCH with a DAI of 1 has been lost, where the UE may not have an available ACK/NACK channel at all, corresponding to the feedback information (D, N/D) in the mapping table, as shown in FIG. 12. The second instance refers to feedback information in an instance other than the first instance of feedback status type 4). In the second instance, more particularly, an SPS service is configured where the UE has at least one available ACK/NACK channel, or in absence of SPS data, the UE has received dynamic data scheduled with respect to at least the PDCCH with a DAI of 1, where the UE also has at least one available ACK/NACK channel. In this way, after performing a mapping between feedback status types and 2-bit ACK/NACK information types according to FIG. 13, ACK/NACK information may be fed back using the channel selection method according to the 4-bit mapping table as shown in FIG. 12.

FIG. 13 illustrates a mapping relationship from feedback status to 2-bit ACK/NACK according to an exemplary embodiment of the present invention.

Referring to FIG. 13, feedback status type 4) needs to be mapped to 2 bits (N/D, N/D), because they both indicate that the feedback information is NACK or DRX. In the mapping table as shown in FIG. 12, when feedback status types of Pcell and Scell are feedback status type 4), it can be identified that the feedback status type of Pcell is one of the two instances of feedback status type 4). When the feedback status type of Pcell is the second instance of feedback status type 4), a QPSK constellation point of the ACK/NACK channel that is present is used for uplink transmission. In the mapping table as shown in FIG. 12, this ACK/NACK channel corresponds to h0. In FIG. 13, feedback status type 3) is mapped to 2 bits (A, N/D). Feedback status type 3) indicates that with respect to one CC, the UE may receive only data of one subframe and thus has only one available ACK/NACK channel. For the PCC, for example, when the UE receives only one piece of SPS data from the PCC, only one ACK/NACK channel semi-statically configured for the SPS service is available. To transmit an uplink feedback signal in this case, the UE selects either this ACK/NACK channel semi-statically configured for the SPS service or an ACK/NACK channel of the SCC as an ACK/NACK channel. According to the above analyses of feedback status type 4), this ACK/NACK channel corresponds to h0 in the mapping table as shown in FIG. 12, and h1 does not exist. Referring back to FIG. 12, when the feedback information for the PCC is (A, N/D), the selected channel is either h0 or a channel of the SCC (h2 or H3), and h1 is impossible. Therefore, feedback status type 3) needs to be mapped to the 2 bits (A, N/D). Feedback status types 1 and 2) indicate that with respect to one CC, the UE receives data of at least two subframes and thus has at least two available ACK/NACK channels. Therefore, the two pieces of mapped ACK/NACK information may not need to be limited. In FIG. 13, feedback status type 1) is mapped to (A, A) and feedback status type 2) is mapped to (N/D, A). In conclusion, after the mapping of feedback status is determined and the ACK/NACK channels to be used are assigned, the first and the second ACK/NACK channels for the PCC are denoted as channel 1 and channel 2, respectively, and the first and the second ACK/NACK channels for the SCC are denoted as channel 3 and channel 4, respectively, thereby fully multiplexing the 4-bit mapping table for FDD as shown in FIG. 12.

Furthermore, the channel selection method supporting CA for LTE-A TDD may further support a backing operation. More particularly, when the UE only receives data of the PCC, the method may be backed to ACK/NACK multiplexing in LTE, where the number of downlink subframes in the bundling window is denoted as M, a piece of ACK/NACK information is obtained for each downlink subframe, an ACK/NACK channel is assigned implicitly to each downlink subframe in the bundling window, i.e., M channels are obtained implicitly, and the channel selection method is used to feed back the M pieces of ACK/NACK information. The channel selection mapping table as used herein may be a table defined in LTE, the table as shown in FIG. 12, or others. According to the LTE method, the available ACK/NACK channels are obtained implicitly from the minimum CCE index of PDCCH for each subframe in the bundling window. When the UE receives data of a subframe from at least one SCC, the channel selection method supporting CA is employed. The ACK/NACK channel assignment for the SCC may also employ the channel selection method described above. With respect to the ACK/NACK channel assignment for the PCC, one ACK/NACK channel for each subframe in the bundling window has already been used upon the backing operation. That is, one ACK/NACK channel semi-statically configured by the higher layer has been used for a subframe transmitting SPS data, or the ACK/NACK channel mapped implicitly from the minimum CCE index of the PDCCH has been used for dynamic data. In this way, upon assignment of ACK/NACK channel for the PCC in absence of the SPS service, the first ACK/NACK channel may be determined from the PDCCH for downlink data with a DAI of 1.

However, the ACK/NACK channel mapped from the minimum CCE index of the PDCCH cannot be used, and the second ACK/NACK channel may be determined from the PDCCH for downlink data with a DAI of 2, but the ACK/NACK channel mapped from the minimum CCE index of the PDCCH cannot be used. Alternatively, the first ACK/NACK channel may be determined from the PDCCH for downlink data with a DAI of 1, but the ACK/NACK channel mapped from the minimum CCE index of the PDCCH cannot be used. For the second ACK/NACK channel, multiple candidate channels may be configured by the higher layer and the ARI for PDCCHs of the SCC may be scheduled to indicate an actually-used channel, thereby increasing the flexibility in resource assignment. In another alternative, the two ACK/NACK channels are configured by the higher layer and indicated by ARIs. More particularly, multiple candidate channels are configured by the higher layer and the ARI for PDCCHs of the SCC may be scheduled to indicate an actually-used channel, thereby increasing the flexibility in resource assignment. Upon assignment of ACK/NACK channel for the PCC in the case of the SPS service, the two ACK/NACK channels may be configured by the higher layer and indicated by ARIs. More particularly, multiple candidate channels are configured by the higher layer and the ARI for PDCCHs of the SCC may be scheduled to indicate an actually-used channel, thereby increasing the flexibility in resource assignment. Alternatively, the first ACK/NACK channel is configured by the higher layer and indicated by an ARI. More particularly, multiple candidate channels are configured by the higher layer and the ARI for PDCCHs of the SCC is scheduled to indicate an actually-used channel, thereby increasing the flexibility in resource assignment, and the second ACK/NACK channel may be determined from the PDCCH for downlink data with a DAI of 1. However, the ACK/NACK channel mapped from the minimum CCE index of the PDCCH cannot be used.

Figure 14:
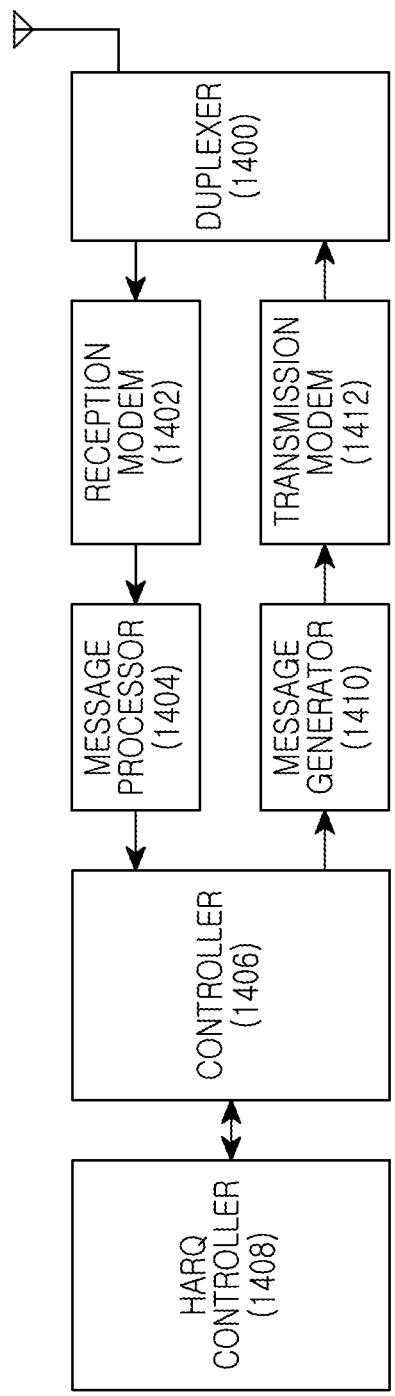
FIG. 14 is a block diagram illustrating an apparatus for feeding back data receiving status according to an exemplary embodiment of the present invention.

FIG. 14 is a block diagram illustrating an apparatus for feeding back data receiving status according to an exemplary embodiment of the present invention.

Referring to FIG. 14, a User Equipment (UE) includes a duplexer 1400, a reception modem 1402, a message processor 1404, a controller 1406, a HARQ controller 1408, a message generator 1410, and a transmission modem 1412.

The duplexer 1400 transmits a transmit signal provided from the transmission modem 1412 through an antenna according to a duplexing scheme, and provides a receive signal from the antenna to the reception modem 1402.

The reception modem 1402 converts and demodulates a Radio Frequency (RF) signal provided from the duplexer 1400 into a baseband signal. The reception modem 1402 may include an RF processing block, a demodulation block, a channel decoding block, and the like. The RF processing block converts an RF signal provided from the duplexer 1400 into a baseband signal according to the control of the controller 1406. The demodulation block may include a Fast Fourier Transform (FFT) operator, and the like, for extracting data loaded on each subcarrier from a signal provided from the RF processing block. The channel decoding block may include a demodulator, a de-interleaver, a channel decoder, and the like.

The message processor 1404 extracts control information from a signal provided from the reception modem 1402 and provides the control information to the controller 1406 which controls an operation of the UE.

The controller 1406 controls to feedback ACK/NACK with respect to received downlink data to the Base Station (BS). The controller 1406 controls to transmit receiving status feedback information with respect to the received downlink data to the BS according to the HARQ controller 1408.

The HARQ controller 1408 sequences downlink subframes for transmitting data for the UE with respect to each CC. The HARQ controller 1408 generates receiving status feedback information for the first X downlink subframes with respect to each CC according to the order of the downlink subframes, where X≤M, M being the number of downlink subframes on a CC. The HARQ controller 1408 controls to transmit the receiving status feedback information generated with respect to each CC to the base station. Additionally, the HARQ controller 1408 may first perform spatial bundling on the receiving status feedback information for two Code Words (CWs) in each downlink subframe. That is, the HARQ controller 1408 performs operation needed for transmitting the receiving status feedback information to the BS as described above with reference to FIGS. 1 through 13.

The message generator 1410 generates a control message to be ACK/NACK feedback according to the control of the controller 1406.

The transmission modem 1412 encodes and converts data to be transmitted to an MS and a control message provided from the message generator 1408, into an RF signal, and transmits the RF signal to the duplexer 1400. The transmission modem 1412 may include a channel encoding block, a modulation block, an RF processing block, and the like. The channel encoding block may include a modulator, an interleaver, a channel encoder, and the like. The modulation block may include an Inverse Fast Fourier Transform (IFFT) operator, and the like, for mapping a signal provided from the channel encoding block to each subcarrier. The RF processing block converts a baseband signal provided from the modulation block into an RF signal, and outputs the RF signal to the duplexer 1400.

As can be seen from the above description, exemplary embodiments of the present invention have the following advantages.

The UE sequences downlink subframes for transmitting data with respect to each CC, generates receiving status feedback information for the first X downlink subframes according to the result of the sequencing, and transmits the receiving status feedback information for each CC to the base station. Because the UE reports the receiving status for only X downlink subframes, the base station may perform a HARQ processing on the first X downlink subframes. For the last downlink subframes, the base station may perform a process by assuming that the UE does not receive the PDCCHs. Therefore, the base station can reach an agreement with the UE on the receiving status of the UE, ensuring that the UE will not misinterpret the receiving status for the downlink subframes due to inconsistencies with the base station between transmitting and receiving feedback so that the HARQ transmission is affected. Moreover, an exemplary embodiment of the present invention saves the uplink overheads occupied by the receiving status feedback information and increases the uplink coverage area, by reducing the number of receiving status feedback information pieces.

Furthermore, the form of receiving status feedback information may be changed flexibly according to the position of the downlink subframe with a DAI of 1 in the M downlink subframes, thereby increasing, to the greatest extent, the information amount of receiving status feedback information for each CC without increasing the overheads.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method performed by a user equipment (UE), the method comprising:
    identifying an uplink channel resource and a feedback value; and
    transmitting, on the uplink channel resource, a signal for indicating the feedback value to a base station,
    wherein the feedback value is identified based on a channel selection according to a response status for each of a plurality of subframes in a primary cell and a response status for each of the plurality of subframes in a secondary cell, and
    wherein the uplink channel resource is identified based on the channel selection according to the response status for each of the plurality of subframes in the primary cell and the response status for each of the plurality of subframes in the secondary cell.

2. The method of claim 1,
    wherein the feedback value is identified from four values based on the response status for each of the plurality of subframes in the primary cell and the response status for each of the plurality of subframes in the secondary cell, wherein the uplink channel resource is identified from four uplink channel resources based on the response status for each of the plurality of subframes in the primary cell and the response status for each of the plurality of subframes in the secondary cell, and wherein the four uplink channel resources include:
 a first uplink resource and a second uplink resource associated with the primary cell; and
 a third uplink resource and a fourth uplink resource associated with the secondary cell.

3. The method of claim 2,
wherein the first uplink resource is determined by a higher layer signaling, and
wherein the second uplink resource is determined by a control channel element (CCE) used for transmission of a physical downlink control channel (PDCCH) in a subframe corresponding to a downlink associated index (DAI) value indicating '1'.

4. The method of claim 2, wherein the third uplink resource and the fourth uplink resource are determined by a higher layer signaling.

5. The method of claim 1, further comprising:
performing spatial HARQ-ACK bundling to codewords in each of at least one of the plurality of subframes in the primary cell or in the secondary cell; and
determining the response status for each of the plurality of subframes in the primary cell and the response status for each of the plurality of subframes in the secondary cell, based on the spatial HARQ-ACK bundling.

6. The method of claim 1, wherein a response status for one subframe of the plurality of subframes comprises at least one of acknowledge (ACK), negative-acknowledge (NACK), or discontinuous transmission (DTX).

7. A method performed by a base station, the method comprising:
receiving, on the uplink channel resource, a signal for indicating a feedback value from a user equipment (UE); and
determining, based on a channel selection, a response status for each of a plurality of subframes in a primary cell and a response status for each of the plurality of subframes in a secondary cell corresponding to the uplink channel resource and the feedback value.

8. The method of claim 7,
wherein the feedback value is identified from four values based on the response status for each of the plurality of subframes in the primary cell and the response status for each of the plurality of subframes in the secondary cell,
wherein the uplink channel resource is identified from four uplink channel resources based on the response status for each of the plurality of subframes in the primary cell and the response status for each of the plurality of subframes in the secondary cell, and
wherein the four uplink channel resources include:
 a first uplink resource and a second uplink resource associated with the primary cell; and
 a third uplink resource and a fourth uplink resource associated with the secondary cell.

9. The method of claim 7,
wherein the first uplink resource is determined by a higher layer signaling, and
wherein the second uplink resource is determined by a control channel element (CCE) used for transmission of a physical downlink control channel (PDCCH) in a subframe corresponding to a downlink associated index (DAI) value indicating '1'.

10. The method of claim 8, wherein the third uplink resource and the fourth uplink resource are determined by a higher layer signaling.

11. The method of claim 7,
wherein the response status for each of the plurality of subframes in the primary cell and the response status for each of the plurality of subframes in the secondary cell are determined based on a spatial HARQ-ACK bundling, and
wherein the spatial HARQ-ACK bundling is performed to codewords in each of at least one of the plurality of subframes in the primary cell or in the secondary cell.

12. The method of claim 7, wherein a response status for one subframe of the plurality of subframes comprises at least one of acknowledge (ACK), negative-acknowledge (NACK), or discontinuous transmission (DTX).

13. A user equipment (UE) comprising:
at least one transceiver; and
at least one processor operatively coupled to the at least one transceiver, configured to:
 identify, an uplink channel resource and a feedback value, and
 transmit, on the uplink channel resource, a signal for indicating the feedback value to a base station,
 wherein the feedback value is identified based on a channel selection according to a response status for each of a plurality of subframes in a primary cell and a response status for each of the plurality of subframes in a secondary cell, and
 wherein the uplink channel resource is identified based on the channel selection according to the response status for each of the plurality of subframes in the primary cell and the response status for each of the plurality of subframes in the secondary cell.

14. The UE of claim 13,
wherein the feedback value is identified from four values based on the response status for each of the plurality of subframes in the primary cell and the response status for each of the plurality of subframes in the secondary cell,
wherein the uplink channel resource is identified from four uplink channel resources based on the response status for each of the plurality of subframes in the primary cell and the response status for each of the plurality of subframes in the secondary cell, and
wherein the four uplink channel resources include:
 a first uplink resource and a second uplink resource associated with the primary cell; and
 a third uplink resource and a fourth uplink resource associated with the secondary cell.

15. The UE of claim 14,
wherein the first uplink resource is determined by a higher layer signaling, and
wherein the second uplink resource is determined by a control channel element (CCE) used for transmission of a physical downlink control channel (PDCCH) in a subframe corresponding to a downlink associated index (DAI) value indicating '1'.

16. The UE of claim 14, wherein the third uplink resource and the fourth uplink resource are determined by a higher layer signaling.

17. The UE of claim 13, wherein the at least one processor is further configured to:

perform spatial HARQ-ACK bundling to codewords in each of at least one of the plurality of subframes in the primary cell or in the secondary cell, and determine the response status for each of the plurality of subframes in the primary cell and the response status for each of the plurality of subframes in the secondary cell, based on the spatial HARQ-ACK bundling.

18. The UE of claim 13, wherein a response status for one subframe of the plurality of subframes comprises at least one of acknowledge (ACK), negative-acknowledge (NACK), or discontinuous transmission (DTX).

19. A base station comprising:
at least one transceiver; and
at least one processor operatively coupled to the at least one transceiver, configured to:
receive on an uplink channel resource, a signal for indicating a feedback value from a user equipment (UE), and
determine, based on a channel selection, a response status for each of a plurality of subframes in a primary cell and a response status for each of the plurality of subframes in a secondary cell corresponding to the feedback value and the uplink channel resource.

20. The base station of claim 19,
wherein the feedback value is identified from four values based on the response status for each of the plurality of subframes in the primary cell and the response status for each of the plurality of subframes in the secondary cell,
wherein the uplink channel resource is identified from four uplink channel resources based on the response status for each of the plurality of subframes in the primary cell and the response status for each of the plurality of subframes in the secondary cell, and
wherein the four uplink channel resources include:
a first uplink resource and a second uplink resource associated with the primary cell; and
a third uplink resource and a fourth uplink resource associated with the secondary cell.

21. The base station of claim 20,
wherein the first uplink resource is determined by a higher layer signaling, and
wherein the second uplink resource is determined by a control channel element (CCE) used for transmission of a physical downlink control channel (PDCCH) in a subframe corresponding to a downlink associated index (DAI) value indicating '1'.

22. The base station of claim 20, wherein the third uplink resource and the fourth uplink resource are determined by a higher layer signaling.

23. The base station of claim 19,
wherein the response status for each of the plurality of subframes in the primary cell and the response status for each of the plurality of subframes in the secondary cell are determined based on a spatial HARQ-ACK bundling, and
wherein the spatial HARQ-ACK bundling is performed to codewords in each of at least one of the plurality of subframes in the primary cell or in the secondary cell.

24. The base station of claim 19, wherein a response status for one subframe of the plurality of subframes comprises at least one of acknowledge (ACK), negative-acknowledge (NACK), or discontinuous transmission (DTX).

* * * * *